United States Patent [19]

Rice et al.

[11] E Re. 28,916

[45] Reissued July 27, 1976

[54] INFLATABLE AQUATIC RESCUE BOARD AND METHOD OF RESCUE

[76] Inventors: Charles A. Rice, R.D. No. 4, Chambersburg, Pa. 17201; Michael L. Foust, 205 W. Church St., Lock Haven, Pa. 17745

[22] Filed: Aug. 8, 1974

[21] Appl. No.: 495,761

Related U.S. Patent Documents

Reissue of:

[64] Patent No.: 3,775,782
Issued: Dec. 4, 1973
Appl. No.: 239,732
Filed: Mar. 30, 1972

[52] U.S. Cl. ..... 5/82 R; 5/365
[51] Int. Cl.[2] ..... A47B 83/42
[58] Field of Search ..... 5/81, 82

[56] References Cited

UNITED STATES PATENTS

| | | | |
|---|---|---|---|
| 722,456 | 3/1903 | Reeves | 5/82 |
| 879,335 | 2/1908 | Southmayd | 5/82 |
| 2,273,672 | 2/1942 | Van Gasselt | 5/82 |
| 2,410,181 | 10/1946 | Peters | 5/82 |
| 2,753,573 | 7/1956 | Barker | 5/350 |
| 3,133,295 | 5/1964 | Klingensmith | 9/11 R |
| 3,155,992 | 11/1964 | Shewmake et al. | 9/11 A |

*Primary Examiner*—Casmir A. Nunberg
*Attorney, Agent, or Firm*—Irvin A. Lavine

[57] ABSTRACT

An inflatable aquatic rescue board is provided having particular advantage in rescuing persons who have sustained injuries while swimming or diving, and who frequently must be held rigid to prevent further injuries while being removed from the water. Prior to inflation, the rescue board is quite flexible, permitting it to be rolled into a compact bundle for storage. Then, upon activation of a self-contained compressed gas supply, the rescue board quickly becomes stiff and buoyant to form an ideal aquatic stretcher. The board comprises a planar structure having two impervious parallel broad faces constrained to a maximum separation by internal members extending therebetween. Transverse reinforcements provide additional rigidity and two longitudinally extending flat springs facilitate unrolling of the rescue board under water during rescue. Strategically placed straps are provided for securing an injured person to the board and handles are placed for maximum ease of removal from water and transportation to competent medical treatment.

9 Claims, 6 Drawing Figures

INFLATABLE AQUATIC RESCUE BOARD AND METHOD OF RESCUE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to water rescue apparatus and more particularly to an inflatable aquatic rescue board and methods of rescue.

2. History of the Prior Art

Many of the water connected injuries occurring each year involve damage to the neck or spine, whereby the injured person should if at all possible be immediately immobilized to preclude aggravation of the injuries during transportation to a hospital or other treatment facility. Sports activities such as diving and water skiing are particularly likely to result in cervical or spinal injuries in which further bending or twisting of the spine can cause permanent damage. Under typical present procedures the person sustaining such injuries is removed from the water under manual restraint and then placed on a stretcher for transportation to a treatment facility. This removal procedure is very dangerous for a person who needs to be immobilized, because positive restraint from relative movement of the injured person's body is very difficult even for a skilled rescuer.

There is in addition the basic problem of rescue of an injured person in the water. In deep water, a rescuing swimmer has insufficient mobility to do little more than tow an injured person to help; and in a pool it is difficult to get an injured person over the side to the pool. A need exists for an easily manipulatable rescue board that can facilitate water rescues.

SUMMARY OF THE INVENTION

An inflatable aquatic rescue board is provided for rescuing injured persons from water. When uninflated, the board is compact and flexible for convenient storage and easy transportation to an injured person. After placement beneath an injured person, the board can be inflated from a self-contained supply of pressurized gas, transforming it into a rigid, floating stretcher.

Methods of rescue in accordance with the invention utilize the steps of partially extending an uninflated rescue board along the upper spine of an injured person, manipulating the person into a desired position while supporting the spine, and then inflating the board and securing the person to it.

In a specific example of a rescue board in accordance with the invention, a gas impervious bag having two substantially parallel broad surfaces forms the rescue board. The two broad surfaces are connected by internal members such as nylon threads which maintain a fixed separation between the broad surfaces when inflated, without impeding gas flow. When inflated, the broad surfaces are quite rigid, but the rigidity *of the uninflated bag* is suitably increased by spaced transverse bars and longitudinally extending flat springs affixed or joined to the broad surfaces as reinforcing members. When uninflated, the broad surfaces collapse together and the rescue board becomes quite flexible, permitting it to be rolled into a lightweight, compact package. The two longitudinal flat springs aid further in unrolling the rescue board during inflation after it is partially unrolled by hand and placed beneath an injured person. This is done without removing the injured person from the water. After inflation, the injured person is rapidly and conveniently immobilized by self-contained straps having easily secured fasteners. Handles are conveniently attached to the head end as well as the sides of the rescue board facilitating removal from the water and transportation to medical treatment.

BRIEF DESCRIPTION OF THE DRAWINGS

A better understanding of the invention can be had from the following detailed description and accompanying drawings, of which.

DETAILED DESCRIPTION

Figure 1:
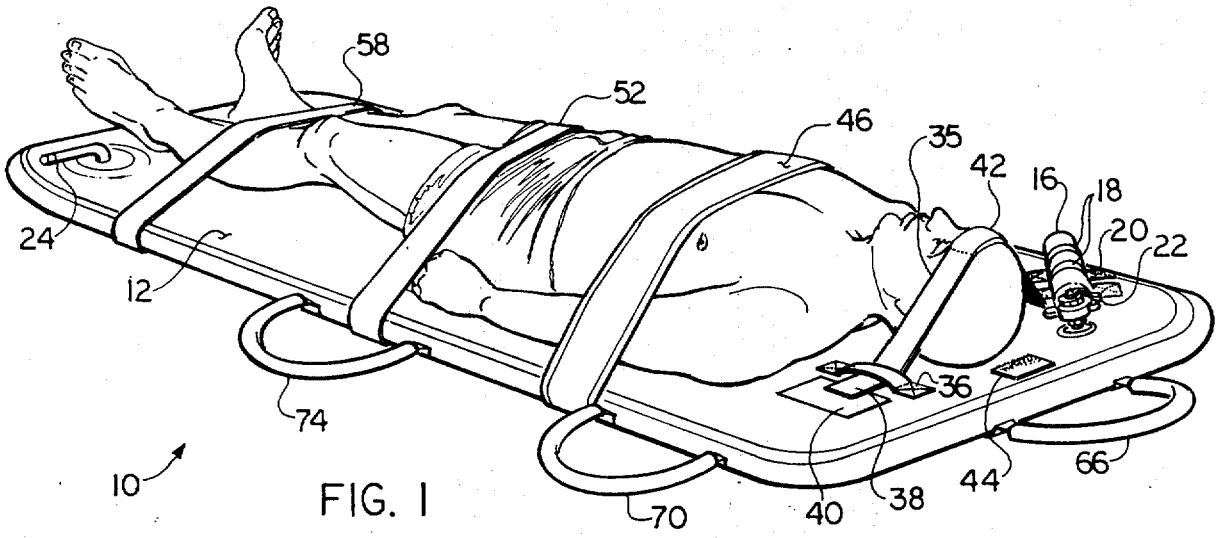
FIG. 1 is a perspective view of an inflatable aquatic rescue board in accordance with the invention shown in an inflated condition with a person strapped thereto.
Figure 2:
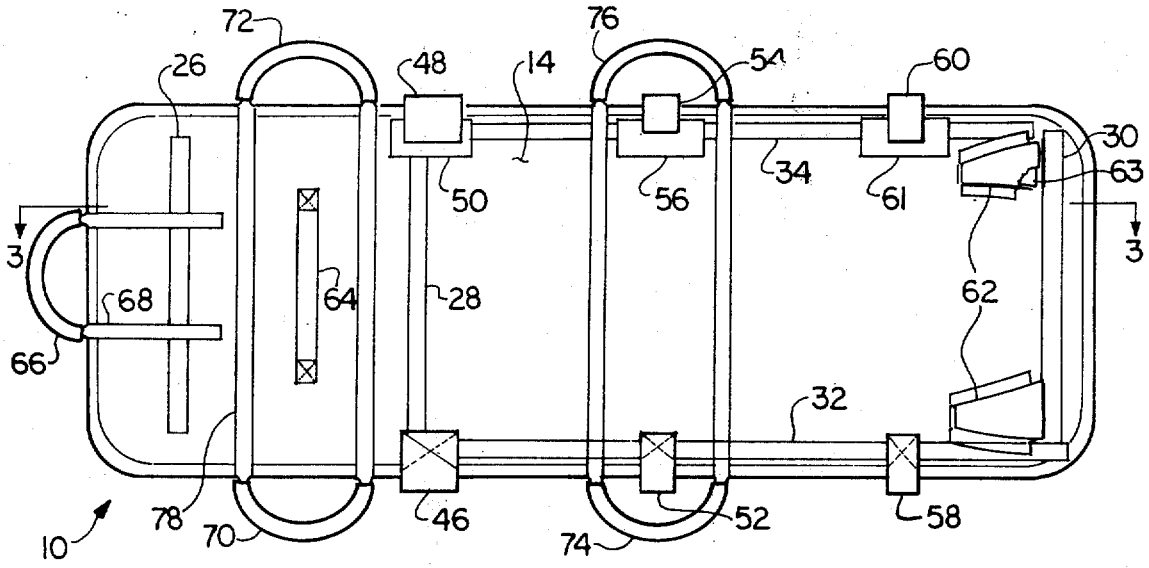
FIG. 2 is a bottom view of the inflatable aquatic rescue board shown in FIG. 1.
Figure 3:
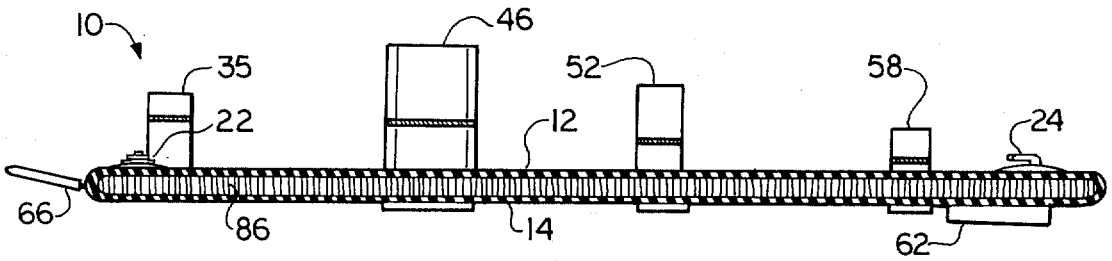
FIG. 3 is a side sectional view of the inflatable aquatic rescue board taken along line 3—3 in the direction of the arrows as shown in FIG. 2.
Figure 4:
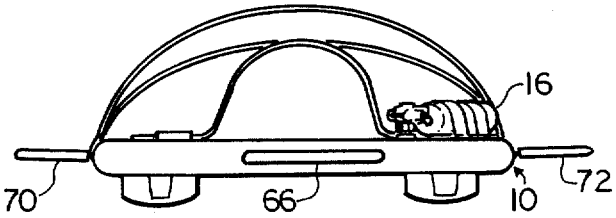
FIG. 4 is an end view of the inflatable aquatic rescue board shown in FIG. 1 taken from the head end.

As shown in FIG. 1, an inflatable aquatic rescue board 10 in accordance with the invention has a rectangular top broad surface 12 for receiving a human form. Referring also to FIGS. 2–4, a rectangular bottom broad surface 14 is aligned immediately below the top broad surface 12 parallel thereto. The two broad surfaces 12, 14 are connected together by flexible internal members such as threads and preferably comprise fabric coated with impervious material such as neoprene rubber. Thus, with the broad surfaces 12, 14 sealed together along their peripheries they form a flat, airtight bag with the two broad surfaces 12, 14 collapsing together when the bag is in a deflated condition, but upon inflation separating to a uniform distance determined by the length of the internal members.

Although selection of size is not critical to practice of the invention, and dimensions need not be precisely controlled, dimensions of approximately 72 inches in the longitudinal direction by approximately 24 inches in the transverse direction have been found preferable for general use. The 72-inch length will support most humans without their feet extending excessively beyond the board 10 while maintaining a reasonable size and weight. Similarly, the 24-inch width is sufficient to make capsizing difficult but does not prevent a single rescuer from reaching across the board 10 to strap down an injured person.

An inflation device 16 such as a standard 5-½ ounce $CO_2$ bottle used for fire extinguishers is fastened by straps 18 to the top broad surface 12 near the head end at one side thereof and is connected to inflate the board 10, when activated. *The preferred internal pressure of the inflated bag or board 10 is approximately 10 p.s.i.* The straps 18 are permanently fastened to the top surface 12 at one end but removably fastened, as by Velcro fasteners 20, at the other end to permit replacement of the inflation device 16. The chosen location of the inflation device 16 permits a rescuer to hold an injured person in place with one hand while operating the inflation device 16 with the other. Manual operation of a lever 22 causes the injection of gas into the interior of the board 10 to quickly inflate it.

Figure 5:
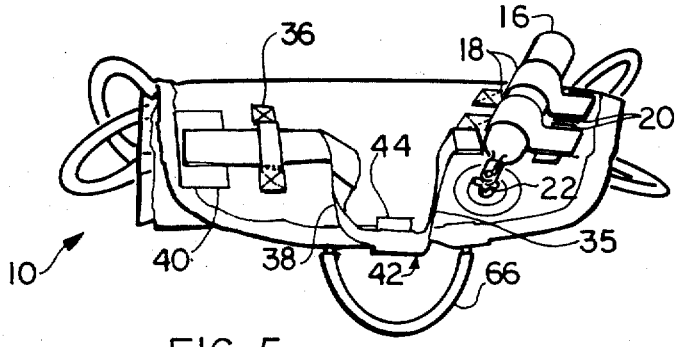
FIG. 5 is a perspective view of an inflatable aquatic rescue board in accordance with the invention in a deflated and rolled up state.

Also located on the top broad surface 12, but to one side of the foot end is a gas release valve 24 that can be opened to deflate the rescue board 10 after use. As shown in FIG. 5, the rescue board 10 loses its rigidity when deflated and can be rolled into a compact bundle for storage.

Although the rescue board 10 is inherently rigid when inflated, a certain amount of reinforcement is desirable. To provide additional strength in the chest area, *particularly before inflation and when the apparatus is being applied to the victim's back*, a pair of transversely extending aluminum bars 26, 28 are positioned on center lines approximately 7-½ inches and 24 inches respectively from the head end of the rescue board 10. These bars 26, 28 are approximate three-sevenths inch wide, three-sixteenths inch thick and extend across substantially the entire width of the rescue board 10. They are permanently molded into the bottom broad surface 14.

Additional support is provided by three one-half inch by 0.002–0.003 inch thick flat steel spring wires molded into the bottom broad surface 14. One spring 30 extends transversely across substantially the entire width of the rescue board 10 on a center line 4-½ inches from the foot end. Second and third springs 32, 34 respectively extend longitudinally along opposite edges of the rescue board. One end of each of the springs 32, 34 terminates opposite the bar 28 and the other end terminates at the spring 30. The springs 30, 32 and 34 normally maintain a flat position. This provides additional rigidity and enables the longitudinally extending springs 32, 34 to aid in the unrolling of the board 10 upon inflation in the water during a rescue.

Four straps are provided to secure a rescued person to the board 10 and prevent his movement thereon. A head strap 35 is positioned about 6-½ inches from the head end of the rescue board 10 to pass across the forehead of a rescued person. The head strap 35 is 1-31/32 inches wide and about 31 inches long. One end is permanently fastened at one side of the head positioned near the inflation device 16. The other end, which passes underneath a loop 36 is secured by a Velcro fastener comprised of sections of hook 38 and plush 40 at the opposite side of the head position. The loop 36 is molded to the top broad surface 12 and insures that the direction of stress on the Velcro coupling is always parallel to the plane of the coupling, the direction of maximum strength, and also prevents rotation of the head during transportation of the injured person. A plush pad 42 near the center of the strap 35 on the underside thereof cushions against the head of an injured person during rescue and secures the strap 35 to a pad of Velcro hooks 44, located in the center of the top broad surface 12 at the head end, when the rescue board is not in use.

A chest strap 46 is positioned on a center line 24 inches from the head end of the board 10 and is somewhat wider than the other straps to prevent its digging into the chest of a person being rescued. One end of the 5-inch wide chest strap 46 is permanently fastened to one edge of the bottom broad surface 14 while the other end of the 46-inch long strap 46 fastens to the opposite edge of the bottom broad surface 14 by Velcro plush 48 and hooks 50 (best seen in FIG. 2). Similarly, a 1-31/32 inch by 42 inch hip strap 52 is positioned 39 inches from the head end with a Velcro plush end 54 fastening to Velcro hooks 56 and a 1-31/32 inch by 42 inch foot strap 58 is positioned 61 inches from the head end with a Velcro plush end 60 fastened to Velcro hooks 61.

A pair of tapering loops 62 are molded to the bottom broad surface 14 at the foot end near opposite edges thereof. The loops 62 receive individual lightweight elements 63 such as styrofoam to add extra buoyancy and support to the foot end of the rescue board 10 to insure that the feet and legs of the injured person do not slide sideways off of the board during inflation and while the person is being securely strapped to the board.

A set of handles is conveniently arranged to assist rescuers in removing the rigid board, to which the injured person is securely strapped, from the water and carrying it in stretcher fashion. A 2 inch wide by 9 inches long transversely extending wrist strap 64 has its ends molded into the bottom broad surface 14 about 14-½ inches from the head end. This wrist strap 64 is provided for use by rescuers as the deflated rescue board 10 is partially unrolled and put into position on an injured person's back, the injured person then being turned over onto the board 10 and the board inflated.

An end handle 66 extends from the head end of the rescue board 10 at the center thereof. It is constructed from a semi-circular length of rubber covered rope having a radius of about 5 inches with a strap 68 extending longitudinally from either end of the handle. The two longitudinally extending ends of the strap 68 are about 6-½ inches long and are molded to the bottom board surface 14. The handle 66 is used to advantage in positioning the rescue board 10 prior to inflation, in towing the inflated board, in removing it from the water, and in subsequently carrying it up steep embankments.

Four additional side handles 70, 72, 74 and 76 similar to the end handle 66 are located in oppositely positioned pairs along the longitudinal edges of the rescue board 10 at center points 14-½ inches and 39 inches from the head end. Portions of the handles 70, 72, 74 and 76 which extend across the bottom of the rescue board 10 are molded into the bottom broad surface 14. The four side handles 70, 72, 74 and 76 are most advantageously used for removing the inflated rescue board from the water and carrying it in a horizontal position.

Figure 6:
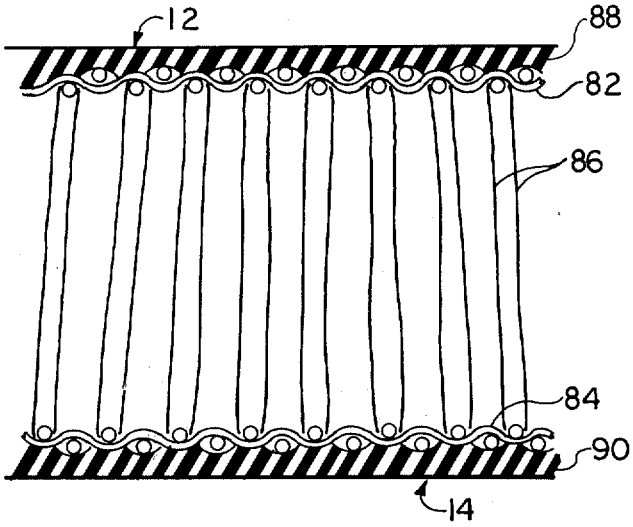
FIG. 6 is an enlarged fragmentary sectional view of an inflatable aquatic rescue board as shown in FIG. 3 and further illustrating details of construction.

The internal construction of the rescue board is best shown in FIG. 6 where it can be seen that the top and bottom broad surfaces 12, 14 are layers of fabric 82, 84 respectively constrained to be aligned in a uniformly spaced apart relationship by internal members 86. The fabric layers 82, 84 are made impervious to gases by coating them with an outside layer of material such as neoprene rubber. That is, a first neoprene layer 88 is bonded to the top side of the top fabric layer 82 and a second neoprene layer 90 is bonded to the bottom side of the bottom fabric layer 84. A drop stitch material conforming to Type 12 of Military Specification MIL-C-17415E Amendment 3 and sold under the trade name Infab is preferred in this example for meeting the construction requirements of the aquatic rescue board 10.

As previously noted in conjunction with FIG. 6, the rescue board 10 is stored in a collapsed, rolled-up condition. As a rescuer approaches an injured swimmer with the rescue board 10, he partially unrolls the rescue board 10 and passes his left arm through the end handle 66 at the head end of the board in the direction of top to bottom and passes his wrist through the wrist loop 64 on the bottom of the rescue board 10, grasping the remaining rolled portion in his left hand. The injured party will most likely be floating face down in the water and the rescuer places the rescue board on his back with the rescuer's left arm assuming the same line as the vertebrae column of the injured swimmer. Still supporting the cervical area, the rescuer uses his free hand to grasp the upper arm of the injured swimmer and turn him over onto his back, exposing his face to air. While still supporting the spinal column of the injured swimmer with the left arm, the rescuer *releases the rolled portion of the bag, so that the springs 32 and 34 unroll it, and with the bag extended under the injured swimmer*, the rescuer then activates the inflation device 16 with his right hand. The [ force of the expanding gases and the action of the longitudinal spring elements automatically complete the unrolling of the ] rescue board 10 [ , which ] then buoyantly supports the injured swimmer in an extended position. After the four straps 35, 46, 52, 58 are secured by their Velcro fastenings, the injured swimmer can be removed from the water and transported to available medical help.

Methods in accordance with the invention provide novel techniques for rescuing and removing injured persons from the water. The spine of the injured person is first longitudinally supported along its length by the arm of the rescuer and the interposed, partially extended board. In this position, the injured party can readily be manipulated to the face-up floating position without bending or twisting of the spine. When this position is achieved the aquatic rescue board is inflated, floating the injured person on his back, but again without shifting the body. When the injured person is then secured to the board, his body is effectively rigidified so that no *damaging* spinal movement ensues despite lifting, tilting or turning of the board.

Boards in accordance with the invention provide advantageous combinations of lightness in weight and initial compactness, together with large inflated area and structural rigidity when inflated. Thus, a rescuer can quickly reach an immobilized victim, but the victim thereafter can be towed or pulled over the side of a swimming pool, and carried as on a stretcher without further danger Although there has been described above a particular arrangement of an inflatable aquatic rescue board in accordance with the invention for the purpose of illustrating the manner in which the invention may be used to advantage, it will be appreciated that the invention is not limited thereto. Accordingly, any and all modifications, variations and equivalent arrangements which may occur to those skilled in the art should be considered to be within the scope of the invention.

What is claimed is:

1. An inflatable aquatic rescue board comprising:

an inflatable bag of impervious material having two substantially parallel broad faces in alignment with each other and constrained to be separated by not more than a maximum distance, [ by internal members ] said bag being generally rectangular and having two longitudinally extending sides and transverse head and foot ends respectively;

said bag being rolled up from the foot end to the head end in the deflated condition;

manually actuable means disposed adjacent the head end and coupled to inflate the bag when activated; and arm receiving means disposed adjacent the head end for enabling a rescuer, while the bag is uninflated and partially rolled and while positioned at the unrolled end, to place the unrolled portion of said bag adjacent the back of an injured person with the arm extending along the spine, the bag unrolling fully under the injured person [ during inflation ] *and being inflated.*

2. The invention as set forth in claim 1 above, including in addition longitudinal spring means disposed along at least one of the broad faces thereof to provide a spring force tending to assist unrolling, and wherein the internal pressure of the inflated bag is approximately 10 psi.

3. The invention as set forth in claim 2 above, further including handle means for carrying the bag in a horizontal position; detachable strap means disposed at spaced apart longitudinal regions for rigidly securing an injured person to one of the broad faces; and means coupled to said manually actuable means for controlling the rate of inflation of said bag.

4. An inflatable aquatic rescue board comprising:

an impervious top broad surface;

an impervious bottom broad surface having a shape substantially conforming to the top broad surface, said bottom broad surface being disposed parallel to and in alignment wth the top broad surface;

[ internal ] means *for constraining* [ disposed between ] the top and bottom broad surfaces [ constraining them ] to a maximum separation while permitting the interior flow of an inflating gas;

said top and bottom broad surfaces being composed of flexible material permitting rolling of said board into a compact package in the deflated condition;

said board having a head end and a foot end with said top and bottom surfaces extending longitudinally the length of said board from said head end to said foot end, the peripheral edges of the top and bottom broad surfaces being [ joined ] *connected* together to form an inflatable bag;

said board being rolled up from the foot end to the head end in the deflated condition;

means for unrolling a portion of said board; [ for placing the unrolled portion of said board adjacent the back of an injured person ] and means for thereafter inflating the bag to [ extend and ] define the rescue board.

5. The invention as set forth in claim 4 above, wherein said top and bottom broad surfaces and internal means comprise a pair of woven panels and interconnecting, drop stitches said panels being coated on the outside surfaces thereof with neoprene.

6. The invention as set forth in claim 4 wherein said rescue board has at least one transversely oriented reinforcement bar secured to at least one of the broad surfaces thereof providing increased rigidity of the board in the transverse direction while at the same time permitting rolling of the deflated board into a compact package.

7. The invention as set forth in claim 4 wherein said board includes a transversely oriented flat spring member secured to at least one of the broad surfaces thereof in the proximity of the foot end of said board and a pair of float members secured to the bottom broad surface with one of said float members located at each end of said spring member whereby the legs and feet of the injured person will be retained on the board during inflation and extension of the board.

8. The invention as set forth in claim 4 [ further including ] *wherein said means for unrolling a portion of said rescue board comprises* longitudinally oriented elongated flat spring [ members ] *means* secured to the [ top broad ] *rescue-board* surface whereby said flat spring [ members ] *means* exert a force to extend said bag in the deflated condition and thereby assist the rescuer in unrolling the board.

9. The invention as set forth in claim 4 including handle means positioned at the transverse edge adjacent the head end of said board and a loop member secured to the bottom broad surface in an area near the middle of said surface providing an opening through which the rescuer may insert his arm and partially unroll the board and the wrist loop through which the rescuer can insert his hand to grasp the remaining rolled portion of the board so that the rescuer may place the board on the back of the injured person prior to inflation of the inflatable bag.

* * * * *